(12) United States Patent
Masuda

(10) Patent No.: US 10,384,659 B2
(45) Date of Patent: Aug. 20, 2019

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/888,585

(22) Filed: Feb. 5, 2018

(65) Prior Publication Data

US 2018/0154873 A1 Jun. 7, 2018

Related U.S. Application Data

(63) Continuation of application No. PCT/JP2016/073923, filed on Aug. 16, 2016.

(30) Foreign Application Priority Data

Aug. 21, 2015 (JP) .................. 2015-163558

(51) Int. Cl.
*F16D 65/18* (2006.01)
*B60T 8/172* (2006.01)
(Continued)

(52) U.S. Cl.
CPC .............. *B60T 8/172* (2013.01); *B60T 13/74* (2013.01); *B60T 13/741* (2013.01); *F16D 65/18* (2013.01);
(Continued)

(58) Field of Classification Search
CPC .......... B60T 7/042; B60T 8/171; B60T 8/173; B60T 13/22; B60T 13/58; B60T 13/74; B60T 13/745; F16D 65/18; F16D 65/62
(Continued)

(56) References Cited

U.S. PATENT DOCUMENTS 6,435,625 B1* 8/2002 Schwarz ................. B60T 13/74
303/20
7,002,314 B2* 2/2006 Arakawa ............... B60T 13/741
318/566
(Continued)

FOREIGN PATENT DOCUMENTS

DE 198 41 170 C 1 2/2000
EP 1 661 780 5/2006
(Continued)

OTHER PUBLICATIONS

International Search Report dated Oct. 11, 2016 in corresponding International Patent Application No. PCT/JP2016/073923.
(Continued)

*Primary Examiner* — Christopher P Schwartz

(57) ABSTRACT

A controller of the electric brake device includes a reaction force compensator to perform compensation such that a rotational resistance, of an electric motor, generated by a reaction force to a pressing force of a friction member against a brake rotor is cancelled out. The reaction force compensator includes: a direct estimator to directly estimate the reaction force from information including at least either a drive voltage or current of the electric motor and at least either a rotational angle of the electric motor or a value obtained by differentiating the rotational angle one or more times; an indirect estimator to estimate the reaction force from an estimated braking force on the basis of a set correlation; and a compensation reaction force determiner to determine a reaction force, to perform the compensation, by using estimation results of direct estimation and indirect estimation at predetermined proportions.

6 Claims, 10 Drawing Sheets

(51) Int. Cl.
- *B60T 13/74* (2006.01)
- *F16D 66/00* (2006.01)
- *H02P 15/00* (2006.01)
- *F16D 121/24* (2012.01)
- *F16D 125/34* (2012.01)

(52) U.S. Cl.
CPC .............. *F16D 66/00* (2013.01); *H02P 15/00* (2013.01); *F16D 2121/24* (2013.01); *F16D 2125/34* (2013.01)

(58) Field of Classification Search
USPC ................................................ 303/3, 15, 20
See application file for complete search history.

(56) References Cited

U.S. PATENT DOCUMENTS

| | | | | |
|---|---|---|---|---|
| 7,227,324 | B2* | 6/2007 | Erben | B60T 7/045 |
| | | | | 318/362 |
| 8,676,409 | B2 | 3/2014 | Takeda et al. | |
| 8,996,270 | B2* | 3/2015 | Bieltz | B60T 13/746 |
| | | | | 188/156 |
| 9,616,865 | B2* | 4/2017 | Yasui | B60T 8/173 |
| 9,878,696 | B2* | 1/2018 | Baehrle-Miller | B60T 13/588 |
| 2004/0026989 | A1* | 2/2004 | Suzuki | B60T 13/741 |
| | | | | 303/89 |
| 2006/0108864 | A1 | 5/2006 | Evans et al. | |
| 2008/0048596 | A1* | 2/2008 | Konishi | B60T 7/042 |
| | | | | 318/372 |
| 2011/0246039 | A1 | 10/2011 | Takeda et al. | |
| 2015/0081186 | A1* | 3/2015 | Yasui | B60T 8/173 |
| | | | | 701/70 |
| 2016/0031427 | A1* | 2/2016 | Yasui | B60T 17/22 |
| | | | | 701/70 |
| 2016/0129895 | A1* | 5/2016 | Masuda | B60T 13/741 |
| | | | | 701/70 |
| 2017/0182984 | A1* | 6/2017 | Masuda | B60T 17/551 |
| 2018/0009420 | A1* | 1/2018 | Tsukamoto | B60T 8/00 |
| 2018/0154872 | A1* | 6/2018 | Masuda | B60T 13/74 |
| 2019/0016325 | A1* | 1/2019 | Yasui | F16D 65/18 |

FOREIGN PATENT DOCUMENTS

| | | |
|---|---|---|
| EP | 1 892 164 | 2/2008 |
| JP | 2003-247576 | 9/2003 |
| JP | 2004-189117 | 7/2004 |
| JP | 2010-270788 | 12/2010 |
| JP | 2011-213201 | 10/2011 |
| JP | 2015-145158 | 8/2015 |

OTHER PUBLICATIONS

English Translation by WIPO of the International Preliminary Report on Patentability for International Patent Application No. PCT/JP2016/073923 dated Mar. 8, 2018, 6 pgs.

Supplementary European Search Report in Application No. 16839148.0 dated May 15, 2019 (5 pages).

* cited by examiner

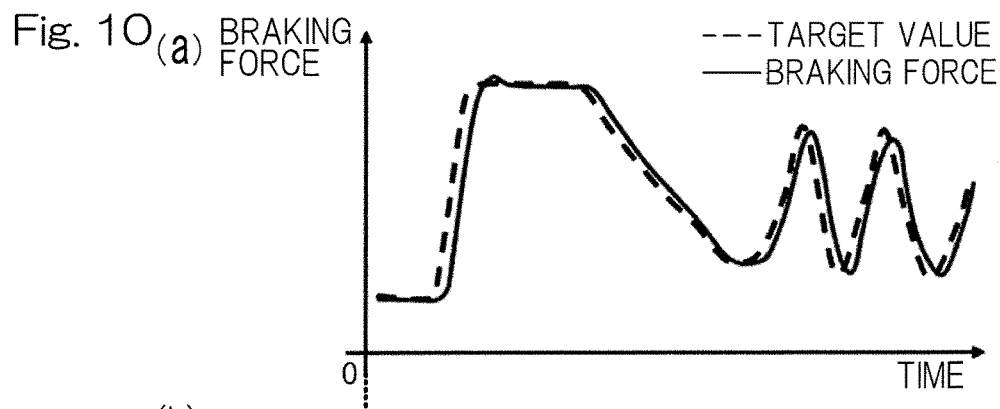
Fig. 10(a)
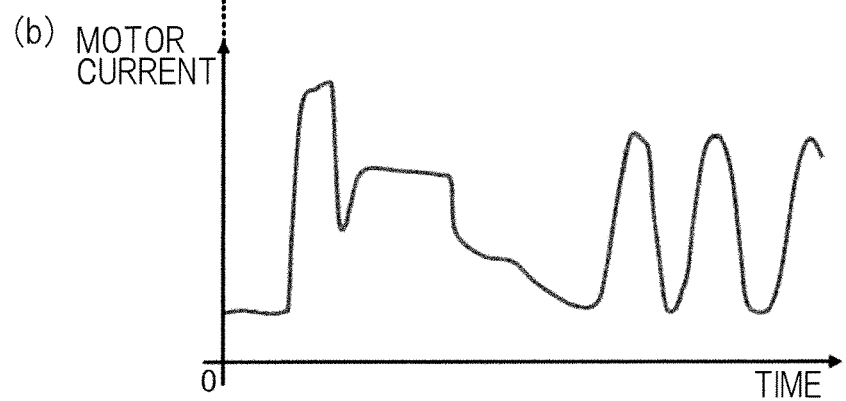
(b)
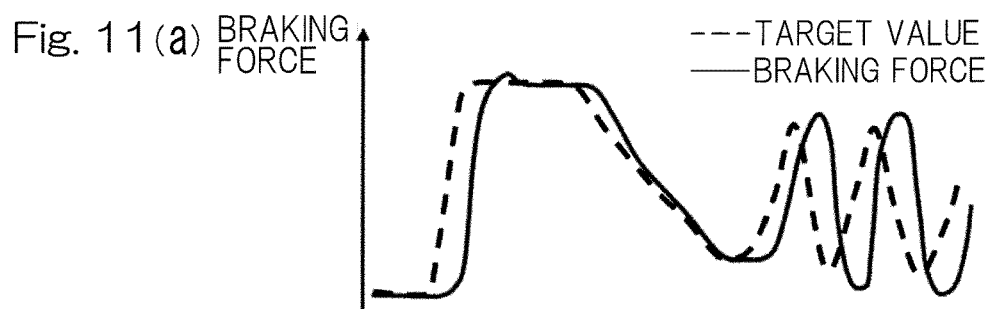
Fig. 11(a)
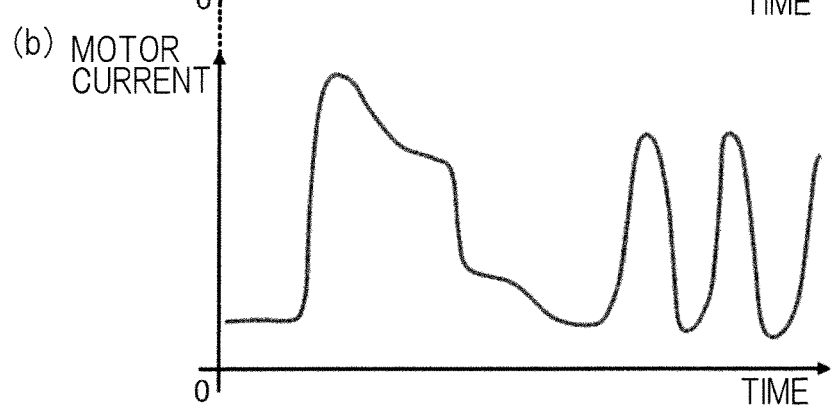
(b)

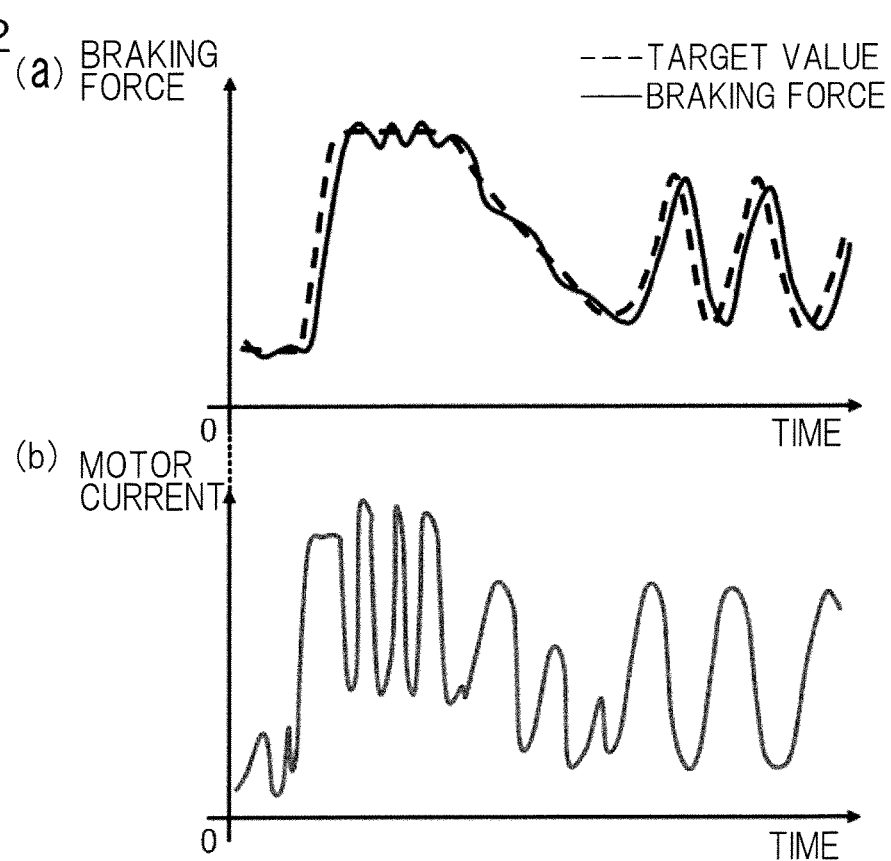

ELECTRIC BRAKE DEVICE

CROSS REFERENCE TO THE RELATED APPLICATION

This application is a continuation application, under 35 U.S.C. § 111(a), of international application No. PCT/JP2016/073923, filed Aug. 16, 2016, which is based on and claims Convention priority to Japanese patent application No. 2015-163558, filed Aug. 21, 2015, the entire disclosure of which is herein incorporated by reference as a part of this application.

BACKGROUND OF THE INVENTION

Field of the Invention

The present invention relates to an electric brake device provided in a vehicle such as an automobile.

Description of Related Art

Conventionally, regarding electric brake devices, the following proposals have been made.

Proposal for an electric brake device that controls a braking force by use of an electric motor (e.g., Patent Document 1).

Proposal for a disc brake that allows detection of a pressing force of a friction pad (e.g., Patent Document 2).

Proposal for an electric actuator that reduces power consumption by use of reverse efficiency (e.g., Patent Document 3).

RELATED DOCUMENT

Patent Document

[Patent Document 1] JP Laid-open Patent Publication No. 2003-247576
[Patent Document 2] JP Laid-open Patent Publication No. 2010-270788
[Patent Document 3] DE Patent No. 19841170

In the electric brake actuator and the brake device using the electric brake actuator as shown in Patent Documents 1 to 3, hysteresis due to, for example, a reaction force of the electric brake actuator is, in some cases, a problem to be addressed in order to achieve high-speed and smooth response. This hysteresis is a phenomenon where there is a difference between positive efficiency that is the efficiency, of an electric brake actuator, when an electric motor is rotated in such a direction that a braking force increases, and reverse efficiency that is the efficiency, of the electric brake actuator, when the electric motor is rotated in such a direction that the braking force decreases. Hysteresis causes a problem that operation of the electric brake actuator cannot be smoothly performed when the directions of rotation are switched.

It is theoretically possible to achieve such an electric brake actuator mechanism that a hysteresis loop in the hysteresis is made small. However, since a very high actuation efficiency is required for such a mechanism, there is a problem of cost increase for reducing loss in a power transmission portion, and thus, practice application of such a mechanism is difficult. For example, Patent Document 3 indicates a method in which reverse efficiency of the actuator is used. When the efficiency of the actuator is thus obtained in advance, compensation for the hysteresis is enabled. However, there is a possibility that accurate compensation cannot be performed depending on the individual difference among the electric actuators and variation in characteristics thereamong.

SUMMARY OF THE INVENTION

An object of the present invention is to provide an electric brake device that uses both high-speed reaction force compensation and accurate reaction force compensation or that combines high-speed reaction force compensation with accurate reaction force compensation so that influence of hysteresis characteristics of an electric brake actuator is eliminated, thereby to achieve a smooth and high-speed control system.

Hereinafter, in order to facilitate the understanding, the present invention will be described with reference to the reference numerals used in embodiments for convenience sake.

An electric brake device of the present invention includes: a brake rotor 31; a friction member 32; a friction member operating actuator 33 including an electric motor and configured to bring the friction member 32 into contact with the brake rotor 31; a braking force estimator 37 configured to estimate a braking force being generated; and a controller 2 configured to control the electric motor 34 such that an estimated braking force estimated by the braking force estimator 37 follows a target braking force. The controller 2 includes a reaction force compensator 7 configured to perform compensation such that a rotational resistance, of the electric motor, generated by a reaction force to a pressing force of the friction member 32 is cancelled out. The reaction force compensator 7 includes: a direct estimator 11 configured to directly estimate the reaction force from information including at least either a drive voltage or current of the electric motor 34 and at least either a rotational angle of the electric motor 34 or a value obtained by differentiating the rotational angle one or more times; an indirect estimator 12 configured to estimate the reaction force from the estimated braking force on the basis of a set correlation; and a compensation reaction force determiner 13 configured to determine a reaction force, to perform the compensation, by using an estimation result from the direct estimator 11 and an estimation result from the indirect estimator 12 at predetermined proportions.

The above-described "predetermined proportions" are not limited to fixed values, but may be changed in accordance with values of items concerning a proportion determination method that is predetermined. The above-described "braking force estimator" may be a sensor 37 and may estimate the braking force from a value detected thereby.

According to this configuration, in order to compensate the reaction force of the electric brake actuator 1 having hysteresis characteristics, compensation that is based on the estimation result from the indirect estimator 12 and that is high-speed compensation based on efficiency characteristics of the electric brake actuator 1 is combined with compensation that is based on the estimation result from the direct estimator 11 and that is strict or accurate compensation based on a disturbance observer, etc. Thus, influence of hysteresis characteristics of the electric brake actuator is eliminated, to achieve a smooth and high-speed control system.

In the present invention, the reaction force compensator 7 may include a proportion switching unit 14 configured to determine, from a state where the estimated braking force follows the target braking force, the proportions of the estimation result, to be used, from the direct estimator 11 and the estimation result, to be used, from the indirect estimator 12, and the compensation reaction force determiner 13 may determine the reaction force, to perform the compensation, by using the proportions that are results determined by the proportion switching unit 14. By changing the proportions to appropriate proportions in accordance with the state of following, etc., influence of the hysteresis characteristics of the electric brake actuator 1 is further appropriately eliminated, to achieve a further smooth and high-speed control system.

In a case where the proportion switching unit 14 is provided, the proportion switching unit 14 may increase the proportion of the estimation result, to be used, from the indirect estimator 12 on the basis of either one or both of an absolute value of a deviation between the estimated braking force and the target braking force, and a differential value of the absolute value of the deviation when either one or both of the absolute value and the differential value of the absolute value increase. Generally, the greater the deviation of the braking force is, the more rapid compensation is required for improving the state of following. Generally, the smaller the absolute value of the deviation of the braking force is, and the more closely the braking force follows the target value, the more accurate compensation is required. Thus, in order to perform smooth and high-speed control, it is preferable to determine a compensation current by use of a mathematical function in which the proportion of a compensation current based on an estimated reaction force from the indirect estimator 12 becomes high when the deviation increases.

In a case where the proportion switching unit 14 is provided, the proportion switching unit 14 may have a function of increasing the proportion of the estimation result, to be used, from the indirect estimator 12 on the basis of a change degree of the target braking force when the change degree increases. The change degree is, in other words, a change rate. Then, the change degree may be taken as a frequency of the target braking force. In this case, the proportion switching unit 14 increases the proportion of the estimation result, to be used, from the indirect estimator 12 when the frequency of the target braking force increases. Generally, the higher the change degree of an inputted target value is, the more rapid compensation is required for improving the followability. Generally, the lower the change degree is, the more accurate compensation is required for preventing unnecessary vibratory operations. Thus, in order to perform smooth and high-speed control, it is preferable to determine a compensation current by using, as a proportion function, a mathematical function in which the proportion of the compensation current based on the estimated reaction force from the indirect estimator 12 becomes high when the deviation increases.

In a case where the proportion switching unit 14 is provided, the proportion switching unit 14 may reduce the proportion of the estimation result, to be used, from the indirect estimator 12 when the estimated braking force becomes low in a predetermined region within an estimation range of the estimated braking force. Accordingly, further smooth and high-speed control can be achieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

FIG. 10 shows graphs showing the state where braking force follows target braking force and change in motor current, in a case where, for example, the example in FIG. 8 is employed in the reaction force compensator, in an operation example of the electric brake device;

FIG. 11 shows graphs showing the state where braking force follows target braking force and change in motor current, in a case where the reaction force compensator in the electric brake device uses only the direct estimator; and FIG. 12 shows graphs showing the state where braking force follows target braking force and change in motor current, in a case where the reaction force compensator in the electric brake device uses only the indirect estimator.

DESCRIPTION OF EMBODIMENTS

Figure 1:
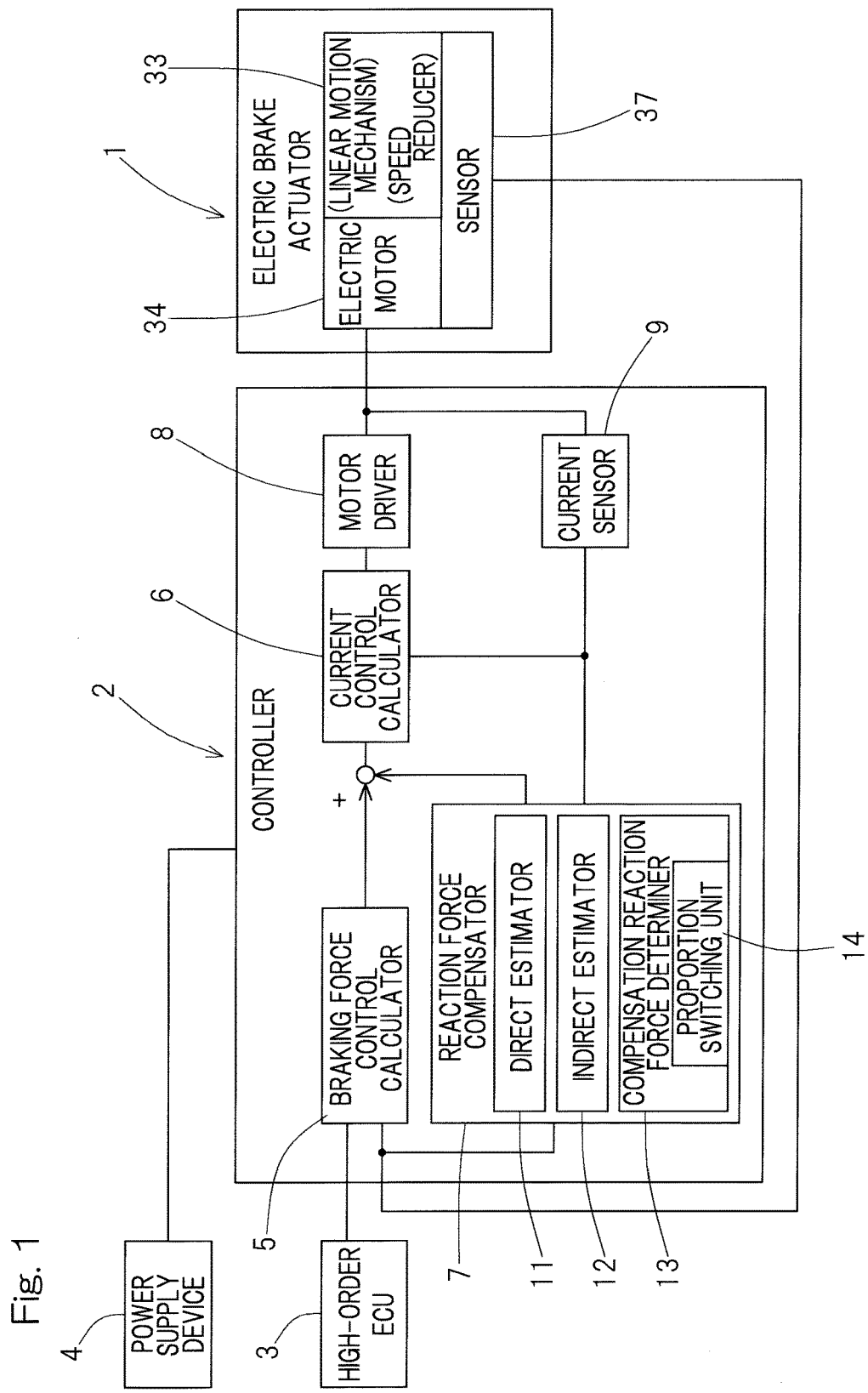
FIG. 1 is a block diagram showing a schematic configuration of an electric brake device according to an embodiment of the present invention, particularly, the schematic configuration of a controller included in the electric brake device.

An embodiment of the present invention will be described with reference to the drawings. In FIG. 1, an electric brake device includes: an electric brake actuator 1 that is a mechanical portion; and a controller 2 that controls the electric brake actuator 1. The controller 2 is connected to a high-order control unit such as a high-order ECU 3 and to a power supply device 4. The high-order ECU 3 is an electric control unit that performs overall control of a vehicle equipped with the electric brake devices, has a cooperative control function and an integrated control function, and further has, for example, a function of calculating, from a manipulation amount of a brake operation portion such as a brake pedal, target braking forces to be provided to the respective electric brake devices 1 of the vehicle, and distributing the target braking forces to the respective electric brake devices 1. The high-order ECU 3 may be a brake-dedicated ECU that is separate from the ECU for the overall control. The power supply device 4 is a battery or the like.

The present embodiment indicates the minimal configuration for incorporating the proposal made by the inventor of the present invention. In FIG. 1 and the following embodiment, the braking force indicates any value corresponding thereto. For example, a pressing force of a friction member such as a friction pad may be used as the braking force, or a braking torque of a wheel equipped with the electric brake device may be used as the braking force with the braking torque being detected by a torque sensor or the like. Alternatively, a system may be adopted in which an electric motor angle is used as an equivalent braking force with the relationship between the braking force and the electric motor angle being obtained in advance from the rigidity of the electric brake actuator.

Figure 2:
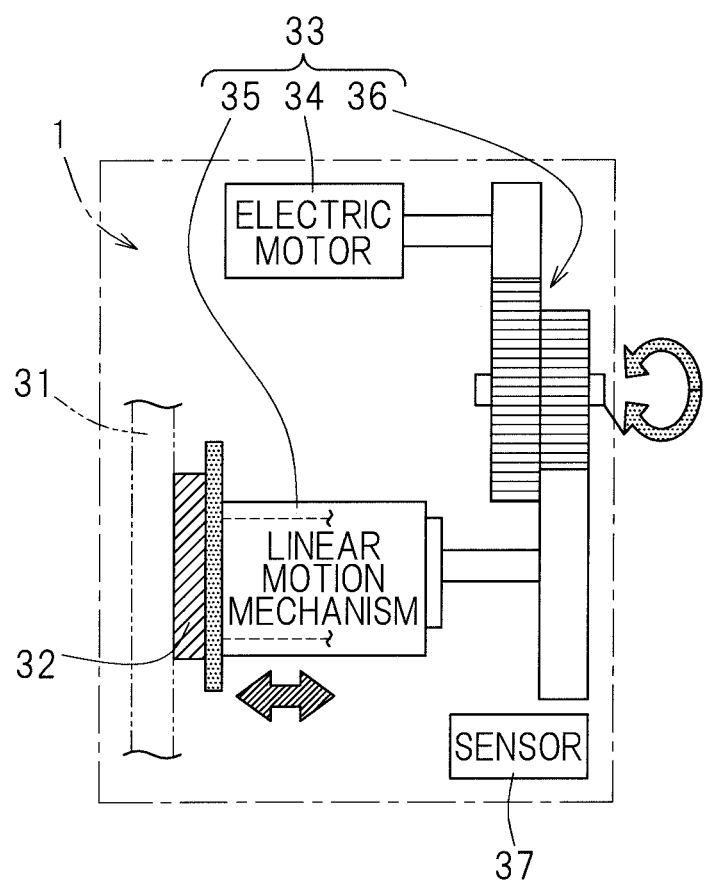
FIG. 2 is an explanatory diagram showing a configuration of an electric brake actuator of the electric brake device.

As showed in, for example, FIG. 2, the electric brake actuator 1 includes: a brake rotor 31; a friction member 32 such as a friction pad; a friction member operating actuator 33 that presses the friction member 32 against the brake rotor 31; and a sensor 37 that is a braking force estimator for detecting a state quantity of the electric brake actuator 1 and estimating a braking force being generated. The brake rotor 31 is fixed to a wheel so as to be integrally rotated therewith. The friction member operating actuator 33 includes: an electric motor 34 serving as a drive source; a linear motion mechanism 35 that converts rotation of the electric motor 34 into reciprocating linear motion of the friction member 32; and a speed reducer or reduction gear 36 such as a gear train that reduces a speed of rotation, or a number of rotation per unit time, of the electric motor 34 and transmits it to the linear motion mechanism 35.

As the electric motor 34, a brushless DC motor is considered to be preferably used since space saving and high output are achieved with the brushless DC motor, and an induction motor or a DC motor with brush may be used. As the linear motion mechanism 35, a linearly moving mechanism such as a feed screw mechanism or a ball ramp can be used. As the speed reducer 36, parallel gears are considered to be preferably used since the parallel gears are inexpensive, and planetary gears, worm gears, or the like may be used, and, in a case where no high driving force is required, the speed reducer 36 may not be used. As the sensor 37, a motor angle sensor, a braking force sensor, or the like may be used.

In FIG. 1, the controller 2 includes: a braking force control calculator 5 that performs such control as to follow a target braking force that is a provided desired braking force; a current control calculator 6 that controls a motor current; a reaction force compensator 7 that performs compensation such that a brake reaction force is cancelled out; a motor driver 8; and a current sensor 9. As the braking force control calculator 5, the current control calculator 6, and the reaction force compensator 7, a microcomputer, a PFGA, an ASIC, a DSP, etc. are considered to be preferably mounted. As the motor driver 8, for example, a half-bridge circuit including a switching element such as an FET and including a switching control circuit, is considered to be preferably used since such a half-bridge circuit is inexpensive. As the current sensor 9, for example, a shunt resistor and an amplifier are used to achieve low cost, or a magnetic field detection sensor is used to achieve high accuracy.

The braking force control calculator 5 determines a motor current such that an estimated braking force follows a target braking force. The current control calculator 6 performs current vector control, etc. for the motor current on the basis of motor characteristics of the electric motor 34.

The reaction force compensator 7 estimates a reaction force to a pressing force of the friction member 32 (refer to FIG. 2) against the brake rotor 31 on the basis of a predetermined condition, and performs addition for a current value from the current control calculator 6 such that influence of a rotational resistance, of the electric motor 34, generated by the reaction force is cancelled out.

The reaction force compensator 7 includes: a direct estimator 11 that directly estimates the reaction force from information including at least either a drive voltage or current of the electric motor 34 and at least either a rotational angle of the electric motor 34 or a value obtained by differentiating the rotational angle one or more times; an indirect estimator 12 that estimates the reaction force from the estimated braking force on the basis of a set correlation (for example, as in FIG. 5); and a compensation reaction force determiner 13 that determines a reaction force, to perform the compensation, by using an estimation result from the direct estimator 11 and an estimation result from the indirect estimator 12 at predetermined proportions.

In the reaction force compensator 7, proportions of the estimation result, to be used, from the direct estimator 11 and the estimation result, to be used, from the indirect estimator 12 may be fixed. However, in the present embodiment, the reaction force compensator 7 includes a proportion switching unit 14 that determines, from a state where the estimated braking force d follows the target braking force, the proportions of the estimation result, to be used, from the direct estimator 11 and the estimation result, to be used, from the indirect estimator 12. The compensation reaction force determiner 13 determines a reaction force, to perform the compensation, in accordance with the proportions that are results determined by the proportion switching unit 14.

Figure 3:
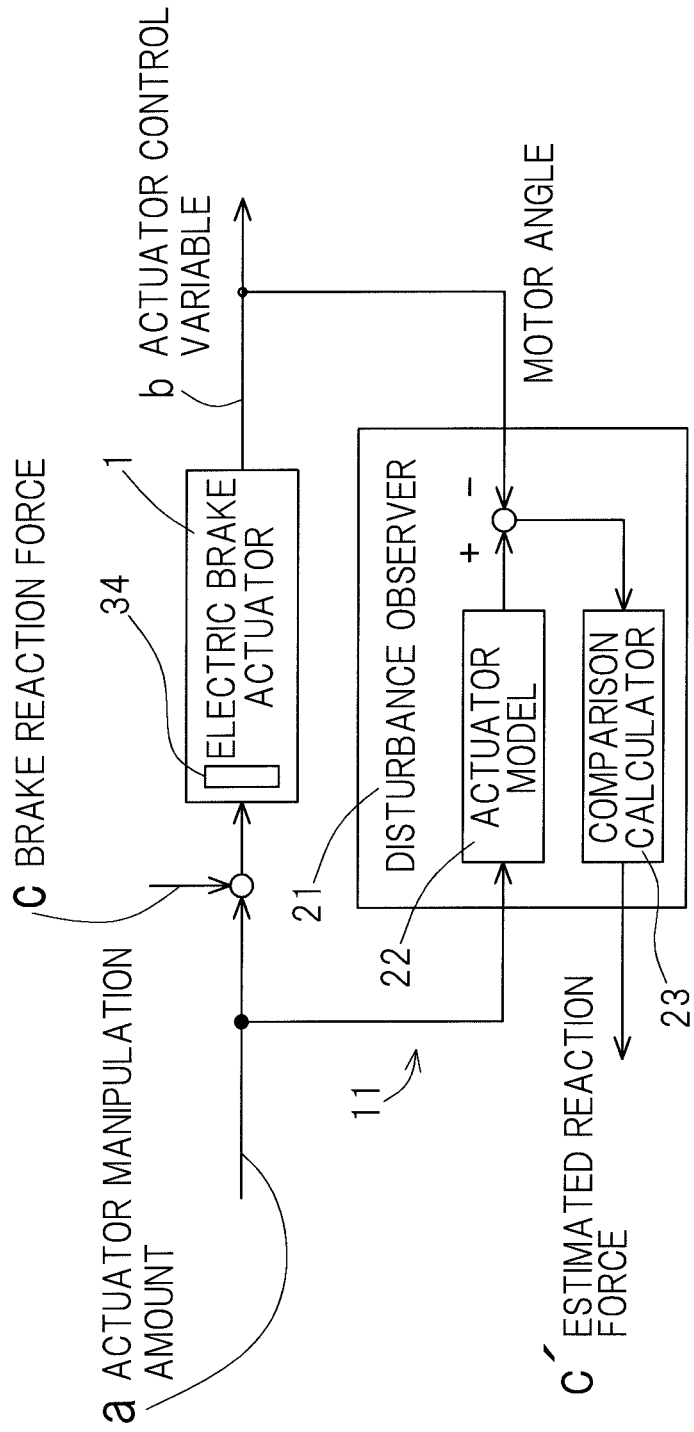
FIG. 3 is a block diagram showing an example of a direct estimator in the controller of the electric brake device.
Figure 4:
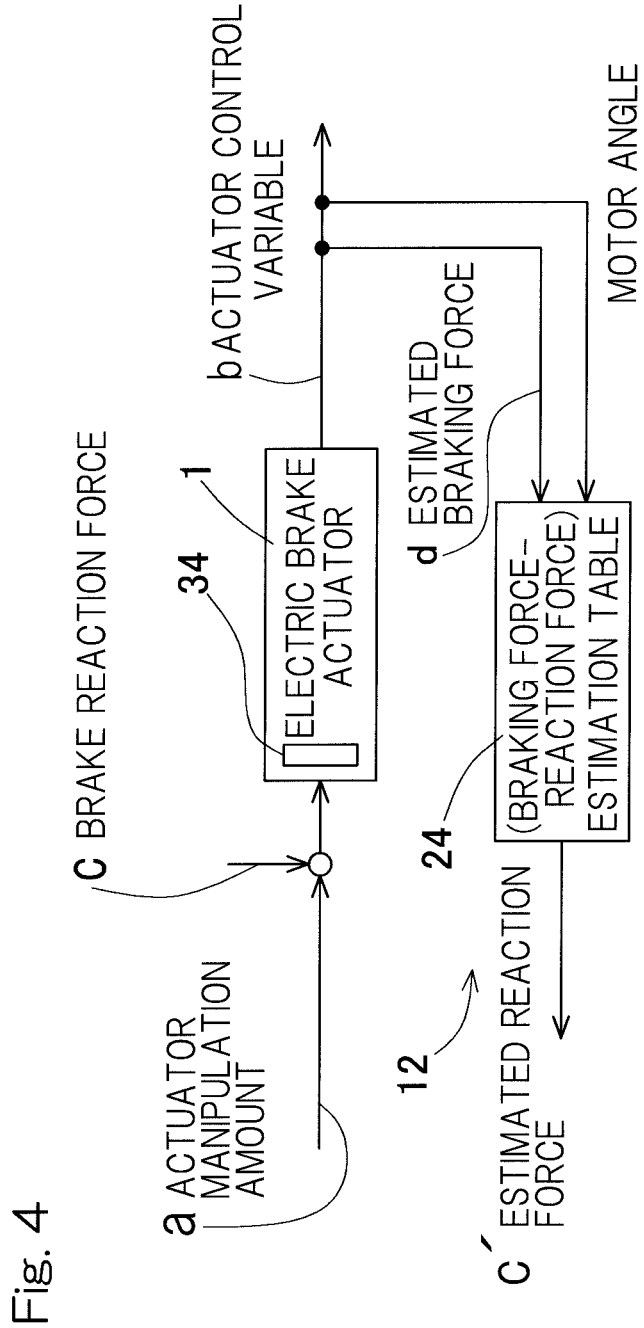
FIG. 4 is a block diagram showing an example of an indirect estimator in the controller of the electric brake device.

FIG. 3 shows a specific example of the direct estimator 11. FIG. 3 shows an example where an estimated reaction force c' of a brake reaction force c inputted as external force is obtained from motion of the electric motor 34 in the electric brake actuator 1. As an actuator manipulation amount a, for example, a current applied to the electric motor 34 is considered to be preferably used since simple motion having only force and inertia is obtained with such a current, and a voltage applied to the electric motor 34 may be used. An actuator control variable b indicates any output from sensors including, for example, a motor angle sensor and a braking force sensor, and, in particular, output from a motor angle sensor is considered to be preferable as a reference output since the motor angle sensor can be inexpensively and easily mounted. In FIGS. 3 and 4, motor angle is used as the actuator control variable b.

The disturbance observer 21 calculates, for an inputted actuator manipulation amount a, an output on the basis of an equation of motion expressing an actuator model 22 having been preset by taking into consideration an experiment result, a simulation result, a measurement result, or the like. The comparison calculator 23 performs comparison calculation to compare an actual motor angle with the calculated output, a brake reaction force c that may have been inputted as external force is estimated, and the brake reaction force c is outputted as an estimated reaction force c'. In the above-described processes, a state estimation observer that uses the external force included in a state quantity is considered to be preferably used since such the state estimation observer does not require differential calculation, and a disturbance estimation observer that uses an inverse model of the electric brake actuator 1 may be used.

Figure 5:
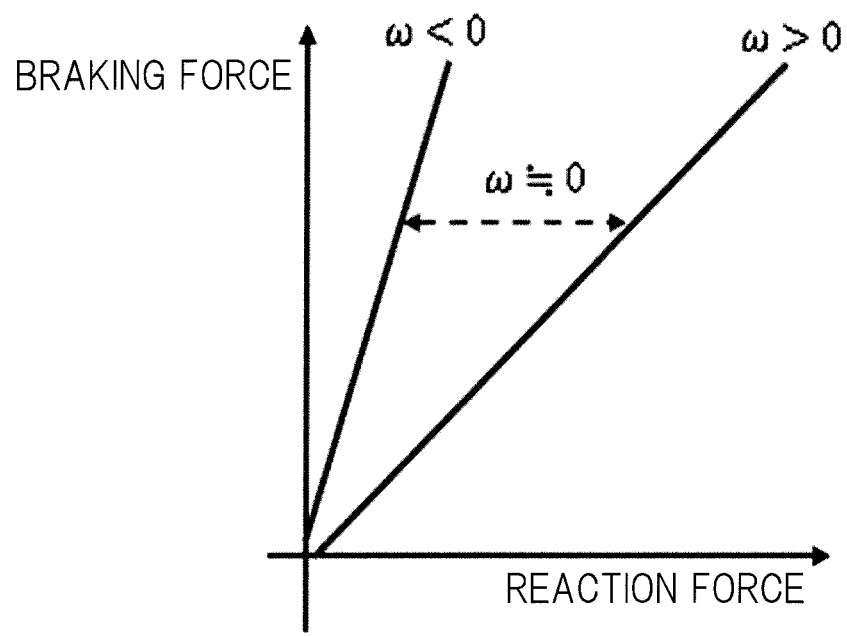
FIG. 5 is a graph showing an example of the relationship between reaction force and braking force.

FIG. 4 shows a specific example of the indirect estimator 12. FIG. 4 shows an example where a reaction force is estimated from the estimated braking force d by use of an estimation table 24, etc. (the reaction force is outputted as an estimated reaction force c'). Generally, since there is a correlation, as shown in FIG. 5, between braking force and reaction force, reaction force estimation is enabled by use of the estimated braking force. Curves indicating the relationship between reaction force and braking force include: a curve indicating a positive efficiency that is an efficiency when rotation is performed at a positive motor angular speed co, that is, in a forward direction; and a curve indicating a reverse efficiency that is an efficiency when rotation is performed at a negative motor angular speed co, that is, in an opposite direction. In a case where the two curves do not coincide with each other, hysteresis exists. Due to the hysteresis, when rotation directions are switched, the reaction force greatly varies even with the same braking force, and thus, smooth operation is hindered. As the estimated braking force d, a parameter, equivalent to the braking force, such as a motor angle that has a correlation with the braking force, and that is based on the rigidity of the actuator may be used.

In the direct estimation method in FIG. 3, it is possible to perform estimation in consideration of the individual difference among the electric brake actuators 1 and the variation in characteristics thereamong. Thus, the direct estimation method is effective in a case where a model error has to be taken into consideration, and has an advantage of preventing excessive reaction force compensation. Meanwhile, the direct estimation method has a disadvantage that reaction force compensation is delayed by the amount of delay of estimation by the disturbance observer 21.

In the indirect estimation method in FIG. 4, only the preset estimation table 24 is referred to. Thus, the indirect estimation method has an advantage of rapid reaction force compensation with a small calculation load. Meanwhile, the indirect estimation method has a disadvantage that, in a case where a model error due to, for example, an error in braking force estimation and the individual difference among the electric brake actuators 1 occurs, problems such as a problem that an operation of the electric brake actuator 1 becomes vibratory due to occurrence of excessive reaction force compensation, can occur.

In the present embodiment, by taking into consideration the above-described merit and demerit (advantage and disadvantage) of direct estimation and the above-described merit and demerit (advantage and disadvantage) of indirect estimation, compensator capable of high-speed reaction force compensation based on characteristics of the electric brake actuator 1, that is, the indirect estimator 12 is combined with compensator capable of accurate reaction force compensation based on operation of the electric brake actuator 1, that is, the direct estimator 11, so that influence of hysteresis characteristics of the electric brake actuator 1 is eliminated, thereby to achieve a smooth and high-speed control system.

Figure 6:
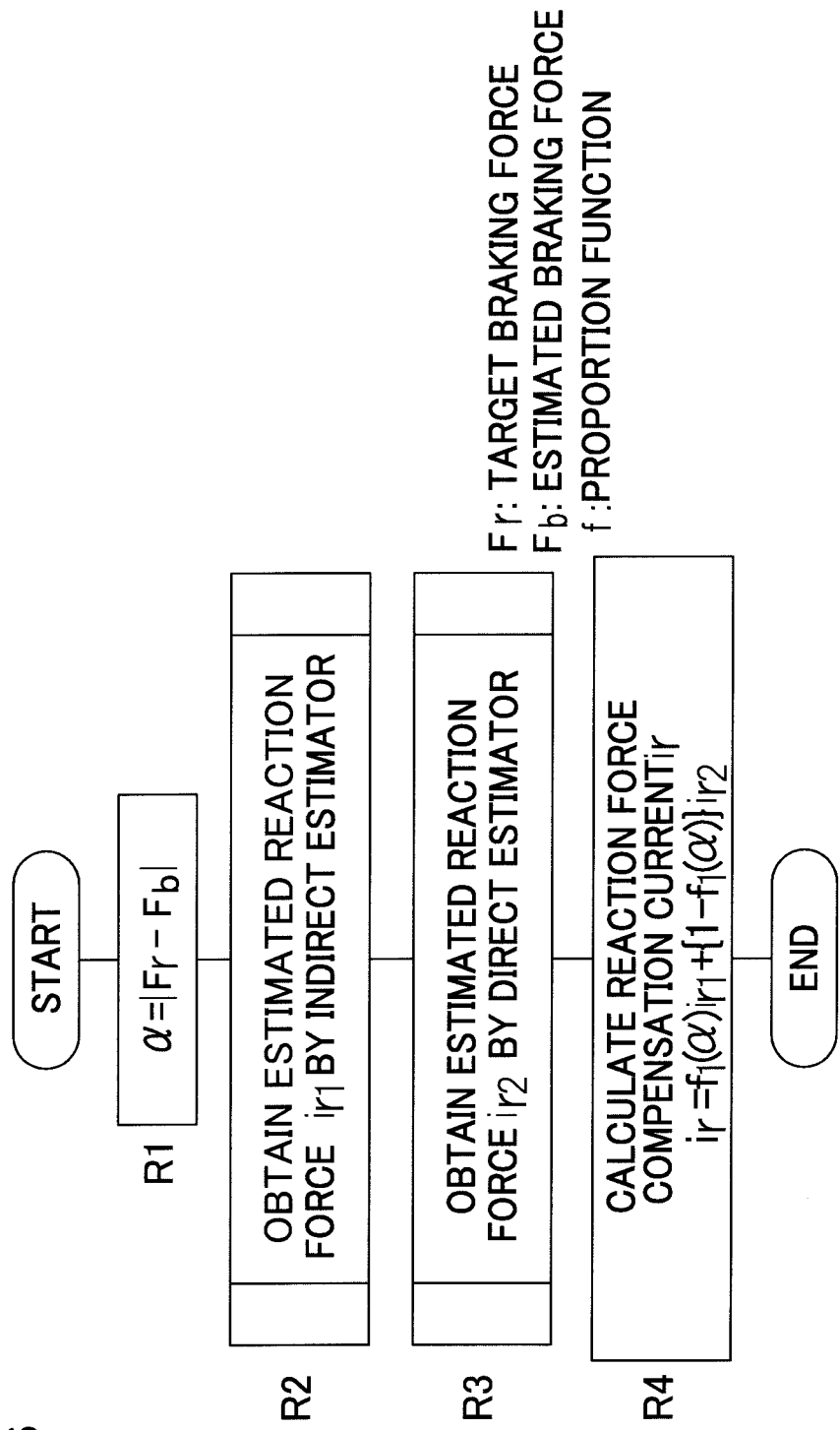
FIG. 6 is a flowchart showing an example of compensation, based on a deviation of a braking force, in a reaction force compensator of the controller.
Figure 7:
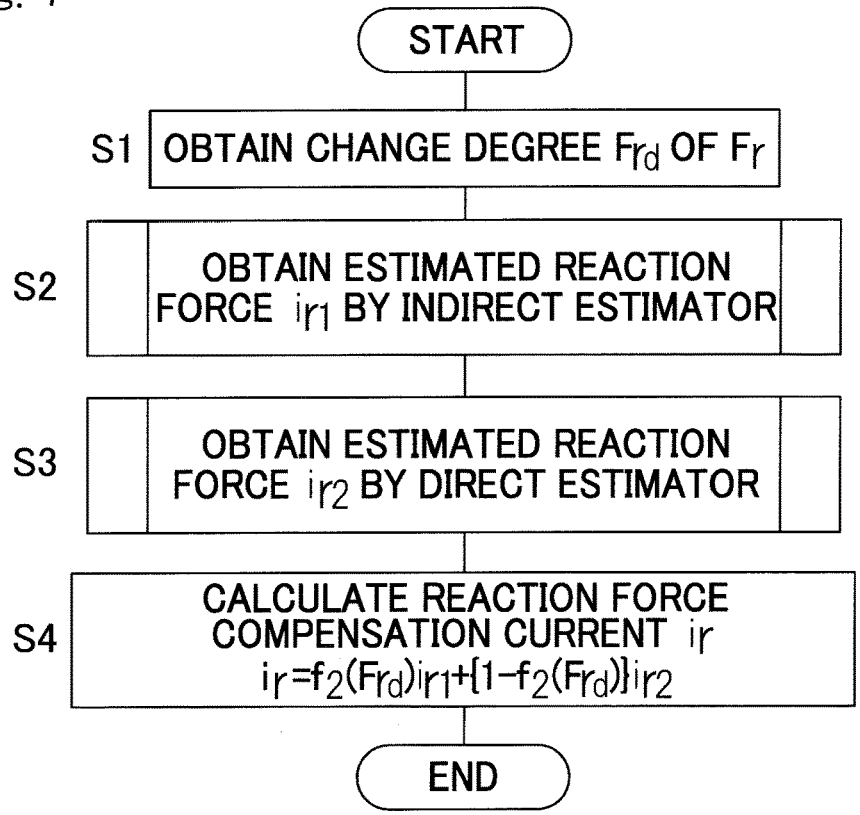
FIG. 7 is a flowchart showing an example of compensation, based on a change degree of a target braking force, in the reaction force compensator of the controller.
Figure 8:
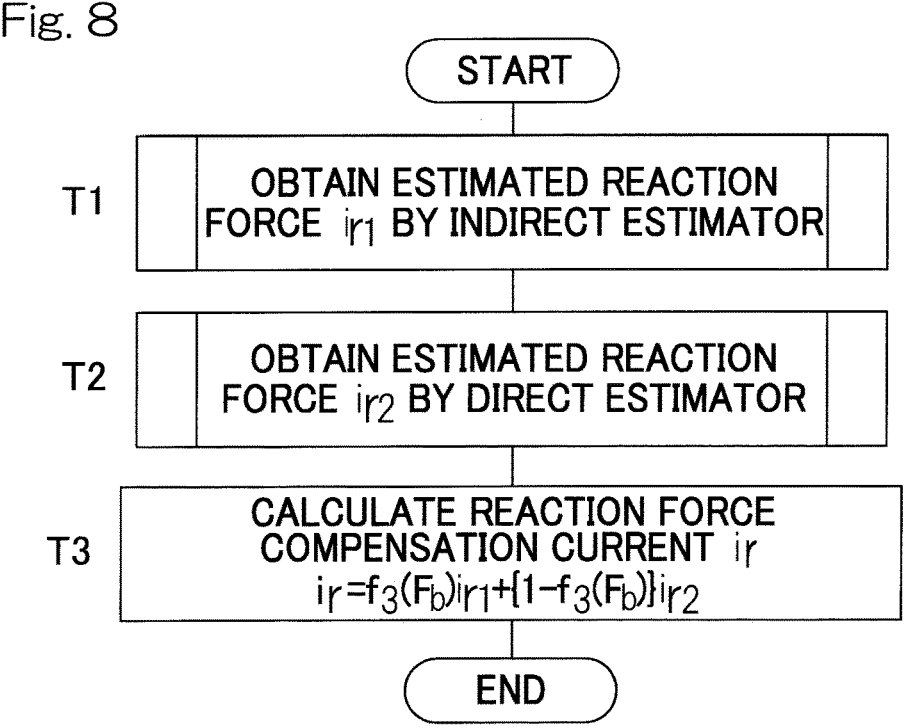
FIG. 8 is a flowchart showing an example of compensation, based on an estimated braking force, in the reaction force compensator of the controller.

The proportion switching unit 14 of the reaction force compensator 7 in FIG. 1 will be specifically described. FIGS. 6 to 8 respectively show examples of different processing methods performed by the compensation reaction force determiner 13 of the reaction force compensator 7 in FIG. 1, particularly, the different processing methods performed by the proportion switching unit 14 of the compensation reaction force determiner 13.

FIG. 6 shows an example of compensation based on a deviation of the braking force. In step R1, an absolute value a of a deviation between a target braking force $F_r$ and an estimated braking force $F_b$ is calculated. Thereafter, an estimated reaction force $i_{r1}$ is obtained by the indirect estimator 12, and an estimated reaction force $i_{r2}$ is obtained by the direct estimator 11 (steps R2 and R3). Regarding the order of obtaining, either the estimated reaction force $i_{r1}$ or the estimated reaction force $i_{r2}$ may be obtained first. The order of obtaining is reversible in also examples in FIGS. 7 and 8 as described above. By use of the two types of obtained forces that are the estimated reaction force $i_{r1}$ and the estimated reaction force $i_{r2}$, a reaction force compensation current $i_r$ is calculated with a predetermined proportion function f (R4). The proportion function f is determined from an experiment result, a simulation result, a measurement result, or the like.

In this example, the following formula is used to calculate the reaction force compensation current $i_r$:

$$i_r = f_1(\alpha) i_{r1} + \{1 - f_1(\alpha)\} i_{r2}.$$

The mathematical function $f_1$ is a type of the proportion function f.

Generally, the greater the deviation of the braking force is, the more rapid compensation is required for improving the state of following. Generally, the smaller the absolute value of the deviation of the braking force is, and the more closely the braking force follows the target value, the more accurate compensation is required. Thus, in the example in FIG. 6, a compensation current is determined by use of a mathematical function f in which the proportion of a compensation current $i_{r1}$ based on an estimated reaction force from the indirect estimator 12 becomes high when the deviation increases.

As shown in the specific example in FIG. 6, the proportion switching unit 14 (refer to FIG. 1) may increase the proportion of the estimation result, to be used, from the indirect estimator 12 on the basis of either one or both of an absolute value of a deviation between the estimated braking force and the target braking force, and a differential value of the absolute value of the deviation when either one or both of the absolute value and the differential value of the absolute value increase.

FIG. 7 shows an example that is based on the change degree of the target braking force. In the example in FIG. 7, a change degree $F_{rd}$ of a target braking force $F_r$ is calculated in step S1. Similarly to the example in FIG. 6, an estimated reaction force $i_{r1}$ is obtained by the indirect estimator 12, and an estimated reaction force $i_{r2}$ is obtained by the direct estimator 11 (steps S2 and S3). By use of the two types of obtained forces that are the estimated reaction force $i_{r1}$ and the estimated reaction force $i_{r2}$, a reaction force compensation current $i_r$ is calculated with a predetermined proportion function f (S4).

In this example, the following formula is used to calculate the reaction force compensation current $i_r$:

$$i_r = f_2(F_{rd}) i_{r1} + \{1 - f_2(F_{rd})\} i_{r2}.$$

The mathematical function $f_2$ is a type of the proportion function f.

Generally, the higher a change degree of the inputted target value is, the more rapid compensation is required for improving the followability. Generally, the lower the change degree is, the more accurate compensation is required for preventing unnecessary vibratory operations. Thus, a compensation current is determined by using, as the proportion function f, a mathematical function in which the proportion of the compensation current $i_{r1}$ based on the estimated reaction force from the indirect estimator 12 becomes high when the change degree increases. As the change degree, for example, an absolute value of a time-differential value of a target braking force, a peak frequency or the like can be used, the peak frequency being calculated by: comparison between a target braking force and a target braking force obtained through a filter or between target braking forces obtained through multiple filters having different time constants; a Fourier analysis of a target braking force; or the like.

As shown in the specific example in FIG. 7, the proportion switching unit 14 may have a function of increasing the proportion of the estimation result, to be used, from the indirect estimator 12 on the basis of the change degree of the target braking force when the change degree $F_{rd}$ increases.

The change degree $F_{rd}$ may be a frequency of the target braking force. That is, the proportion switching unit 14 may have a function of increasing the proportion of the estimation result, to be used, from the indirect estimator 12 on the basis of the frequency of the target braking force when the frequency increases.

FIG. 8 shows an example of compensation based on an estimated braking force $F_b$. In the example in FIG. 8, similarly to each example described above, an estimated reaction force $i_{r1}$ is obtained by the indirect estimator 12, and an estimated reaction force $i_{r2}$ is obtained by the direct estimator 11 (steps T1 and T2). By use of the two types of obtained forces that are the estimated reaction force $i_{r1}$ and the estimated reaction force $i_{r2}$, a reaction force compensation current $i_r$ is calculated with a predetermined proportion function f (T3).

In this example, the following formula is used to calculate the reaction force compensation current $i_r$:

$$i_r = f_3(F_b)i_{r1} + \{1 - f_3(F_b)\}i_{r2}.$$

The mathematical function $f_3$ is a type of the proportion function f.

Generally, the lower the braking force is, the higher the proportion, per unit error, of the compensation reaction force becomes. Thus, a compensation current is determined by use of a mathematical function in which the proportion of a compensation current $i_{r1}$ based on the estimated reaction force from the indirect estimator 12 becomes high when the estimated braking force increases.

As shown in the specific example in FIG. 8, the proportion switching unit 14 may reduce the proportion of the estimation result, to be used, from the indirect estimator 12 when the estimated braking force becomes low in a predetermined region within an estimation range of the estimated braking force.

Figure 9:
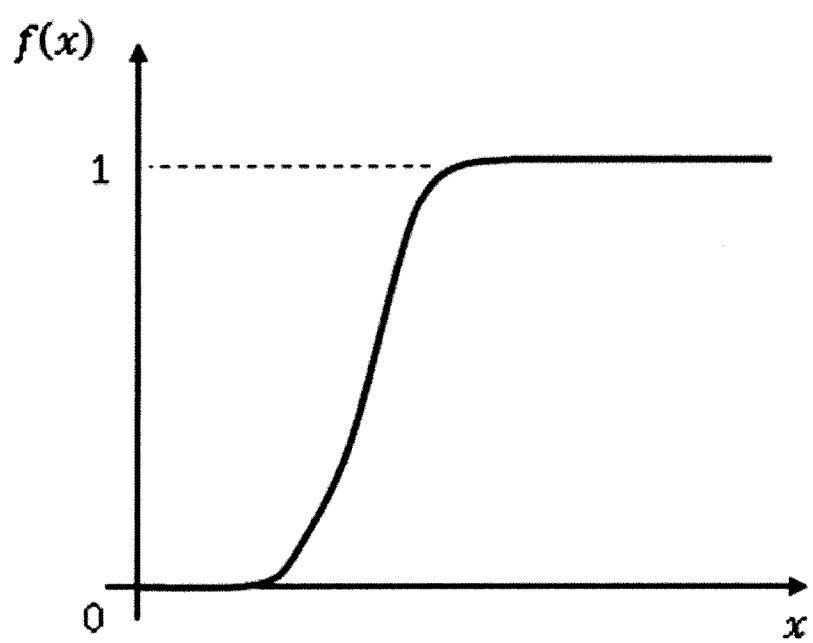
FIG. 9 is a graph showing an example of a mathematical function, for determining a proportion, in the reaction force compensator of the controller.

FIG. 9 shows an example of a mathematical function for determining the proportions. As shown in FIG. 9, a mathematical function which connects 0 and 1 by a smooth curve along with change (increase or decrease) in x, is considered to be preferable. Alternatively, a mathematical function which connects 0 and 1 by a straight line so that linear change is made along with the change in x, may be used, or a discrete function in which switch from 0 to 1 is abruptly made, may be used. The numerical values between which change of f(x) is made, may not necessarily be 0 and 1, but may be any values which is the proportions between the estimated result of the direct estimator 11 and that of the indirect estimator 12 changed equivalently thereto.

Any one of the proportion determination methods in FIGS. 6 to 8 may be used alone, or some of the proportion determination methods in FIGS. 6 to 8 may be combined, to determine a reaction force compensation current.

FIGS. 10 to 12 show operation examples of the electric brake device. FIG. 10 shows an operation example of the electric brake device according to the present embodiment. FIG. 10 shows control waveforms in smooth and high-speed control.

FIG. 11 shows an example where only the direct estimator 11 is used. In the example in FIG. 11 where only the direct estimator 11 is used, as compared to the present embodiment (FIG. 10) where the direct estimator 11 and the indirect estimator 12 are combined, reaction force compensation is delayed, and thus, delay in response occurs, in a situation where high-speed operation is required.

FIG. 12 shows an example where only the indirect estimator 12 is used. In the example where only the indirect estimator 12 is used, as compared to the present embodiment (FIG. 10) where the direct estimator 11 and the indirect estimator 12 are combined, excessive reaction force compensation occurs due to influence of a model error, etc. such that compensation based on positive efficiency and compensation based on reverse efficiency are frequently switched, and thus, unnecessary vibrations occur particularly in a situation where mild respond is desired.

As described above, in the present embodiment, high-speed reaction force compensation based on characteristics of the electric brake actuator 1, that is, the estimated result of the indirect estimator 12 is combined with accurate reaction force compensation based on operation of the electric brake actuator 1, that is, the estimated result of the direct estimator 11, so that influence of hysteresis characteristics of the electric brake actuator 1 is eliminated, thereby to achieve a smooth and high-speed control system.

The braking force control calculator 5, the current control calculator 6, the direct estimator 11, the indirect estimator 12, and the compensation reaction force determiner 13 are, specifically, configured with a software mathematical function on a processor (not shown) or a hardware circuit that enables calculation and output of a result by using a LUT (Look Up Table) implemented by software or hardware, or a predetermined transform function contained in a library of software or hardware equivalent thereto, etc., and, as necessary, by using a comparison function or a four arithmetic operation function or hardware equivalent thereto, etc.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention used by claims or in a scope equivalent thereto.

REFERENCE NUMERALS

1 . . . electric brake actuator
2 . . . controller
5 . . . braking force control calculator
6 . . . current control calculator
7 . . . reaction force compensator
8 . . . motor driver 9 . . . current sensor
11 . . . direct estimator
12 . . . indirect estimator
13 . . . compensation reaction force determiner
14 . . . proportion switching unit
31 . . . brake rotor
32 . . . friction member
33 . . . friction member operating actuator
34 . . . electric motor
37 . . . sensor (braking force estimator)

What is claimed is:

1. An electric brake device comprising:
a brake rotor;
a friction member;
a friction member operating actuator including an electric motor and configured to bring the friction member into contact with the brake rotor;
a braking force estimator configured to estimate a braking force being generated; and
a controller configured to control the electric motor such that an estimated braking force estimated by the braking force estimator follows a target braking force, wherein
the controller includes a reaction force compensator configured to perform compensation such that a rotational resistance, of the electric motor, generated by a reaction force to a pressing force of the friction member is cancelled out, and
the reaction force compensator includes a direct estimator configured to directly estimate the reaction force from information including at least either a drive voltage or current of the electric motor and at least either a rotational angle of the electric motor or a value obtained by differentiating the rotational angle one or more times, an indirect estimator configured to estimate the reaction force from the estimated braking force on the basis of a set correlation, and a compensation reaction force determiner configured to determine a reaction force, to perform the compensation, by using an estimation result from the direct estimator and an estimation result from the indirect estimator at predetermined proportions.

2. The electric brake device as claimed in claim 1, wherein
the reaction force compensator includes a proportion switching unit configured to determine, from a state where the estimated braking force follows the target braking force, the proportions of the estimation result, to be used, from the direct estimator and the estimation result, to be used, from the indirect estimator, and
the compensation reaction force determiner determines the reaction force, to perform the compensation, by using the proportions that are results determined by the proportion switching unit.

3. The electric brake device as claimed in claim 2, wherein
the proportion switching unit increases the proportion of the estimation result, to be used, from the indirect estimator on the basis of either one or both of an absolute value of a deviation between the estimated braking force and the target braking force, and a differential value of the absolute value of the deviation when either one or both of the absolute value and the differential value of the absolute value increase.

4. The electric brake device as claimed in claim 2, wherein
the proportion switching unit has a function of increasing the proportion of the estimation result, to be used, from the indirect estimator on the basis of a change degree of the target braking force when the change degree increases.

5. The electric brake device as claimed in claim 2, wherein
the proportion switching unit has a function of increasing the proportion of the estimation result, to be used, from the indirect estimator on the basis of a frequency of the target braking force when the frequency increases.

6. The electric brake device as claimed in claim 2, wherein
the proportion switching unit reduces the proportion of the estimation result, to be used, from the indirect estimator when the estimated braking force becomes low in a predetermined region within an estimation range of the estimated braking force.

* * * * *